United States Patent
Moosaei et al.

(10) Patent No.: US 10,402,667 B2
(45) Date of Patent: *Sep. 3, 2019

(54) TRAFFIC-LIGHT DETECTION AND CLASSIFICATION USING COMPUTER VISION AND DEEP LEARNING

(71) Applicant: Ford Global Technologies, LLC, Dearborn, MI (US)

(72) Inventors: Maryam Moosaei, Mishawaka, IN (US); Madeline J Goh, Palo Alto, CA (US); Vidya Nariyambut Murali, Sunnyvale, CA (US); Yi Zhang, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/105,775

(22) Filed: Aug. 20, 2018

(65) Prior Publication Data
US 2019/0005340 A1 Jan. 3, 2019

Related U.S. Application Data

(63) Continuation of application No. 15/360,883, filed on Nov. 23, 2016, now Pat. No. 10,185,881.

(51) Int. Cl.
*G06K 9/00* (2006.01)
*G06K 9/46* (2006.01)
*G06T 5/00* (2006.01)

(52) U.S. Cl.
CPC ....... *G06K 9/00825* (2013.01); *G06K 9/4652* (2013.01); *G06T 5/007* (2013.01); *G06T 2207/10024* (2013.01); *G06T 2207/20024* (2013.01)

(58) Field of Classification Search
CPC .............. G06K 9/00825; G06K 9/4652; G06T 5/007; G06T 2207/10024; G06T 2207/2002
See application file for complete search history.

(56) References Cited

U.S. PATENT DOCUMENTS 8,983,136 B2 * 3/2015 Liu .................... G06K 9/00818
382/104

* cited by examiner

*Primary Examiner* — Huy T Nguyen
(74) *Attorney, Agent, or Firm* — David R. Stevens; Stevens Law Group

(57) ABSTRACT

A method is disclosed for detecting and classifying one or more traffic lights. The method may include converting an RGB frame to an HSV frame. The HSV frame may be filtered by at least one threshold value to obtain at least one saturation frame. At least one contour may be extracted from the at least one saturation frame. Accordingly, a first portion of the RGB may be cropped in order to encompass an area including the at least one contour. The first portion may then be classified by an artificial neural network to determined whether the first portion corresponds to a not-a-traffic-light class, a red-traffic-light class, a green-traffic-light class, a yellow-traffic-light class, or the like.

20 Claims, 6 Drawing Sheets

TRAFFIC-LIGHT DETECTION AND CLASSIFICATION USING COMPUTER VISION AND DEEP LEARNING

CROSS REFERENCE TO RELATED PATENT APPLICATION

The present application is a continuation of U.S. patent application Ser. No. 15/360,883, filed on Nov. 23, 2016, which is incorporated by reference in its entirety.

BACKGROUND

Field of the Invention

This invention relates to vehicular systems and more particularly to systems and methods for using image-based detection and classification of traffic lights as a basis for controlling one or more functions of a vehicle.

Background of the Invention

Traffic lights communicate vital information. Any failure to properly detect and classify a traffic light is a serious safety violation that may result in death, injury, and/or significant damage to property. Accordingly, what are needed are computerized systems that reliably detect and classify traffic lights.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
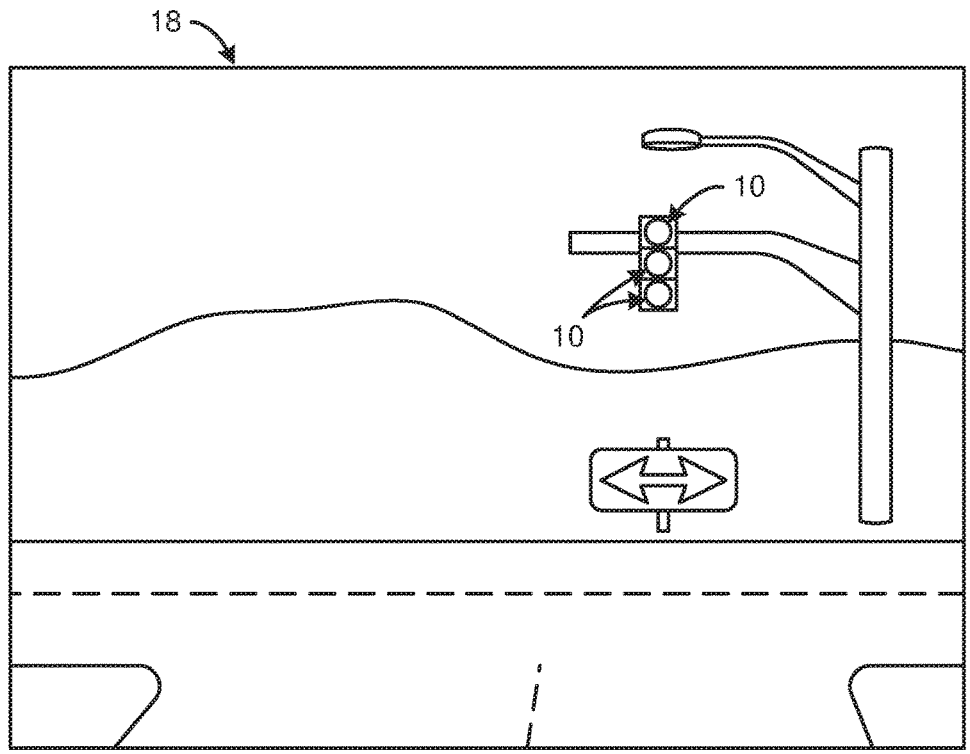
FIG. 1 is a schematic diagram illustrating an exemplary image that may be captured by a forward-looking camera carried on-board a vehicle.
Figure 2:
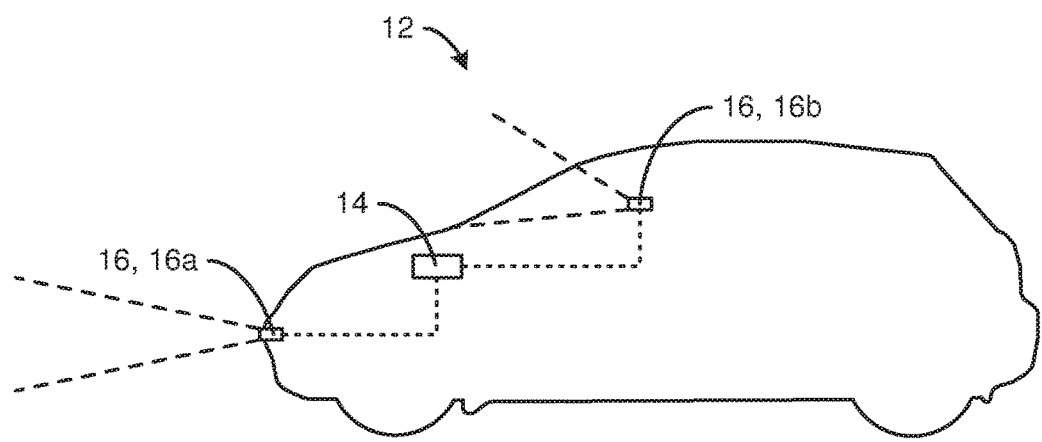
FIG. 2 is a schematic diagram illustrating one embodiment of a vehicle carrying on-board a system for detecting and classifying traffic lights in accordance with the present invention.

Referring to FIGS. 1 and 2, traffic lights 10 communicate vital information that must be properly assimilated for a vehicle 12 to be safely operated. This reality creates significant challenges for drivers and for autonomous driving systems. For example, if a driver is distracted, he or she may not properly detect and/or respond to a traffic light 10. Similarly, since traffic lights 10 are ubiquitous, autonomous driving systems may be required to detect and respond to a variety of traffic lights 10.

To overcome these challenges, a vehicle 12 in accordance with the present invention may carry on-board a system 14 tasked with detecting and classifying traffic lights. A system 14 in accordance with the present invention may use the outputs of one or more on-board sensors 16 as the basis for such detection and classification. The sensors 16 included within a vehicle 12 may take any suitable form. For example, one or more sensors 16 may comprise cameras, light sensors, speedometers, braking sensors, steering sensors, throttle sensors, or the like or a combination or sub-combination thereof.

In selected embodiments, a system 14 in accordance with the present invention may control one or more functions of a vehicle 12. For example, a system 14 may control the operation of one or more warning systems of a vehicle 12. Accordingly, should the data from one or more sensors 16 indicate that a vehicle 12 is approaching a red light with excessive speed (e.g., no braking, too little braking, or the like), a system 14 may instruct one or more warning systems to issue one or more warnings (e.g., flash a light, sound an alarm, vibrate a steering wheel, or the like). Alternatively, or in addition thereto, a system 14 may control the operation of one or more core systems of a vehicle 12. Accordingly, should the data from one or more sensors 16 indicate that a vehicle 12 is approaching a red light with excessive speed, a system 14 may activate the brakes of the vehicle 12.

In certain embodiments, one or more sensors 16 in accordance with the present invention may be forward-facing or forward-looking cameras 16a (e.g., cameras directed to an area ahead of a vehicle 12), point-of-view cameras 16b (e.g., cameras capturing a driver's point of view through a windshield), or the like or a combination or sub-combination thereof.

Image data (e.g., video) captured by one or more sensors 16 may be processed by a system 14 as individual images 18 or frames 18. For example, an artificial neural network within a system 14 may be fed selected portions of one or more images 18 captured by one or more sensors 16. The artificial neural network may take such portions into consideration as it determines which class (e.g., which traffic light 10) is represented therein. Accordingly, a system 14 may control one or more functions of a vehicle 12 in accordance with classifications made by an artificial neural network.

In certain embodiments, the classifications performed by an artificial neural network may occur in real time with the capturing of the sensor data upon which the classification is based. That is, an artificial neural network may quantify the correspondence of particular sensor data (e.g., image data) to one or more classes within a very short period of time after the capture of that particular sensor data by one or more sensors 16. In selected embodiments, that very short period of time may be about one second or less.

Figure 3:
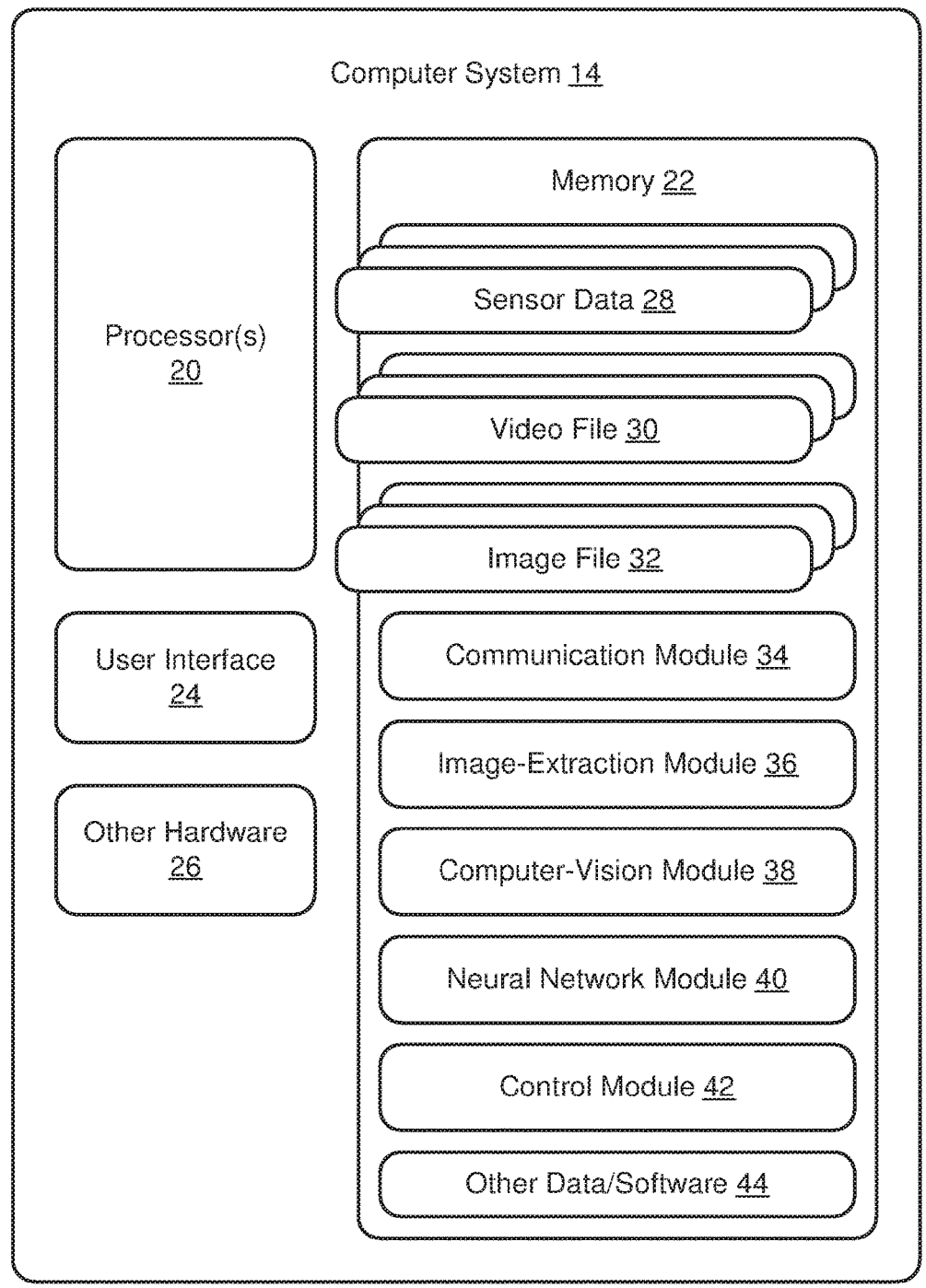
FIG. 3 is a schematic block diagram illustrating one embodiment of a system for detecting and classifying traffic lights in accordance with the present invention.

Referring to FIG. 3, a system 14 in accordance with the present invention may generate or collect information characterizing one or more traffic lights 10 using computer vision, deep learning, or a combination thereof. A system 14 may accomplish this in any suitable manner. For example, a system 14 may be embodied as hardware, software, or some combination thereof.

In selected embodiments, a system 14 may include computer hardware and computer software. The computer hardware of a system 14 may include one or more processors 20, memory 22, one or more user interfaces 24, other hardware 26, or the like or a combination or sub-combination thereof. In certain embodiments, all or some subset of this computer hardware may be hardware already included as part of a vehicle 12. That is, all or some portion of the computer hardware may be multipurpose and perform tasks that are already associated with the operation of the vehicle 12. Alternatively, a system 14 in accordance with the present invention may be dedicated exclusively to detecting, classifying, and/or responding to traffic lights 10.

The memory 22 of a system 14 in accordance with the present invention may be operably connected to the one or more processors 20 and store the computer software. This may enable the one or more processors 20 to execute the computer software. Thus, a system 14 may augment the functionality or features of a vehicle 12 by adding and/or modifying software, adding additional hardware to the vehicle 12, or a combination thereof.

A user interface 24 of a system 14 may enable an engineer, technician, driver, or the like to interact with, run, customize, or control various aspects of a system 14. A user interface 24 of a system 14 may include one or more buttons, keypads, keyboards, touch screens, pointing devices, or the like or a combination or sub-combination thereof. Alternatively, or in addition thereto, a user interface 24 may comprise one or more communication ports (e.g., plug in ports, wireless communication ports, etc.) through which one or more external computers or devices may communicate with a system 14 or one or more components thereof. In certain embodiments, a user interface 24 may enable a user (e.g., a driver) to manually control (e.g., select, incrementally increase or decrease) one or more warnings to be issued in one or more traffic-light-related situations.

In selected embodiments, the memory 22 of a system 14 may store (at least temporality) sensor data 28 (e.g., one or more segments of signal output by one or more sensors 16 carried on-board a vehicle 12), video 30 (e.g., one or more video files 30) collected or captured by one or more sensors 16 carried on-board a vehicle 12, one or more images files 32 containing, defining, or corresponding to one or more images captured by one or more sensors 16 or extracted from video collected or captured by one or more sensors 16, or the like or a combination or sub-combination thereof.

Additionally, the memory 22 may store one or more software modules. For example, the memory 22 may store a communication module 34, image-extraction module 36, computer-vision module 38, neural network module 40, control module 42, other data or software 44, or the like or a combination or sub-combinations thereof. Alternatively, one or more of the communication module 34, image-extraction module 36, computer-vision module 38, neural network module 40, control module 42 may be embodied as hardware or comprise hardware components. Thus, while FIG. 3 shows the communication module 34, image-extraction module 36, computer-vision module 38, neural network module 40, and control module 42 as being software-only modules that are stored in memory 22, in actuality, one or more of these modules 34, 36, 38, 40, 42 may comprise hardware, software, or a combination thereof.

A communication module 34 may enable data such as one or more segments of sensor data 28, video files 30, image files 32, software components (e.g., one or more modules 34, 36, 38, 40, 42 or updates thereto), information characterizing a traffic light 10, classifications (e.g., classification information output by the artificial neural network of a system 14), or the like or combinations of sub-combinations thereof to be passed into or out of a system 14 in accordance with the present invention. For example, a communication module 34 forming part of a system 14 carried on-board a vehicle 12 may enable the system 14 to receive an update to its computer-vision module 38, neural network module 40, or the like. Accordingly, improvements developed off-board a vehicle 12 may be brought on-board as desired or necessary.

An image-extraction module 36 may extract one or more images 18 from video captured by one or more sensors 16. For example, an image-extraction module 34 may extract one or more images 18 from a video file 30 that is stored in memory 22, video that is being output by a sensor 16, or the like. In selected embodiments, an image-extraction module 36 may store one or more images 18 that are extracted thereby as images files 32 in memory 22.

A computer-vision module 38 may determine which portions of one or more images 18 should be processed by a neural network module 40. For example, a computer-vision module 38 may identify and crop one or more portions of an image 18 that are more likely to contain a traffic light 10. Such portions may then be passes to a neural network module 40 to be classified.

A neural network module 40 may be, include, or support an artificial neural network programmed to perform or apply deep learning. The deep learning performed or applied by an artificial neural network may use one or more algorithms to model high-level abstractions in data corresponding to one or more portions of one or more images 18 collected by the one or more sensors 16 connected to a system 14 in accordance with the present invention. In selected embodiments, this may be accomplished by using multiple processing layers comprising multiple non-linear transformations.

For example, an artificial neural network corresponding to a neural network module 40 may comprise feed-forward computational graphs with input nodes, hidden layers and output nodes. For classifications that involve images, pixel-values of an input image forming part of the classification may be assigned to input nodes, and then be fed through the network, passing a number of non-linear transformations. At the end of the computation, the output node may yield a value that corresponds to the class inferred by the neural network.

In order for an artificial neural network corresponding to a neural network module 40 to be able to distinguish between different classes, it needs to be trained based on examples. Accordingly, to create an artificial neural network that is able to classify a plurality of different traffic lights, a large collection of example images (e.g., hundreds to thousands for each type) having known (e.g., labeled) characteristics must be used as training data. Thus, using back-propagation, an artificial neural network may be trained.

An artificial neural network corresponding to a neural network module 40 may be trained while operating within or on the hardware a non-production system 14. For example, an artificial neural network may be trained on an off-board system 14 in a computer laboratory, a non-production system 14 carried on-board a test vehicle 12 specifically for the purposes of training, or the like. Once trained, an artificial neural network may be "cloned" or otherwise copied onto or imported within a production system 14 forming part of a production vehicle 12.

When trained, an artificial neural network corresponding to a neural network module 40 may receive one or more inputs (e.g., cropped portions of one or more images 18 captured by one or more sensors 16) and classify those inputs as having a particular numeric affinity (e.g., percentage "score") for each class for which the artificial neural network was trained. Accordingly, if an artificial neural network were trained on ten different classes, then for one or more inputs, the artificial neural network may output ten numeric scores. Each such score may be indicative of the affinity of the one or more inputs (or of the physical reality reflected by the one or more inputs) to a different class.

In a decisive or clear classification, the one or more inputs may show a strong affinity to one class and weak affinity to all other classes. In an indecisive or unclear classification, the one or more inputs may show no preferential affinity to any particular class. For example, there may be a "top" score for a particular class, but that score may be close to other scores for other classes.

Accordingly, in selected embodiments, a neural network module 40 may apply one or more threshold comparisons or tests to determine whether any particular classification is sufficiently decisive or clear so as to be acted or relied upon (e.g., whether the classification is sufficiently decisive or clear so as to merit some change to the functioning of a vehicle 12). For example, a neural network module 40 may test a classification to see if the separation between a top score and all other scores meets or satisfies a certain separation threshold.

An artificial neural network in accordance with the present invention may be trained to recognize (e.g., produce affinity scores for) a certain, predetermined set of classes. The number of classes within such a set may vary between embodiments. In certain embodiments, the number of classes may be one greater than the types of traffic lights a corresponding vehicle 12 is lightly to encounter. For example, if a vehicle 12 were only likely to encounter three types of traffic lights (e.g., a circular red light, a circular yellow light, and a circular green light), the number of classes may be four and include a not-a-traffic-light class, red-traffic-light class, yellow-traffic-light class, and green-traffic-light class.

However, in most driving environments, a vehicle 12 will encounter more than three types of traffic lights 10. Accordingly, an artificial neural network may more typically be trained to recognized more than four classes. For example, in selected embodiments, an artificial neural network in accordance with the present invention may be trained to recognize a not-a-traffic-light class, red-traffic-light class, yellow-traffic-light class, green-traffic-light class, red-left-arrow class, red-right-arrow class, yellow-left-arrow class, yellow-right-arrow class, green-left-arrow class, green-right-arrow class, or the like or a combination or sub-combination thereof.

A control module 42 may be programmed to request, initiate, or implement one or more actions or functions based on selected sensor data 28, the classifications determined by a neural network module 40, or the like or a combination thereof. For example, when a control module 40 determines from the data 28 and classifications that a vehicle 12 is approaching a red light with excessive speed, the control module 42 may request, initiate, or implement one or more warnings (e.g., a flashing light, a sounding alarm, vibration of a steering wheel, or the like or a combination or sub-combination thereof). Alternatively, or in addition thereto, the control module 42 may request, initiate, or implement braking of the vehicle 12.

Figure 4:
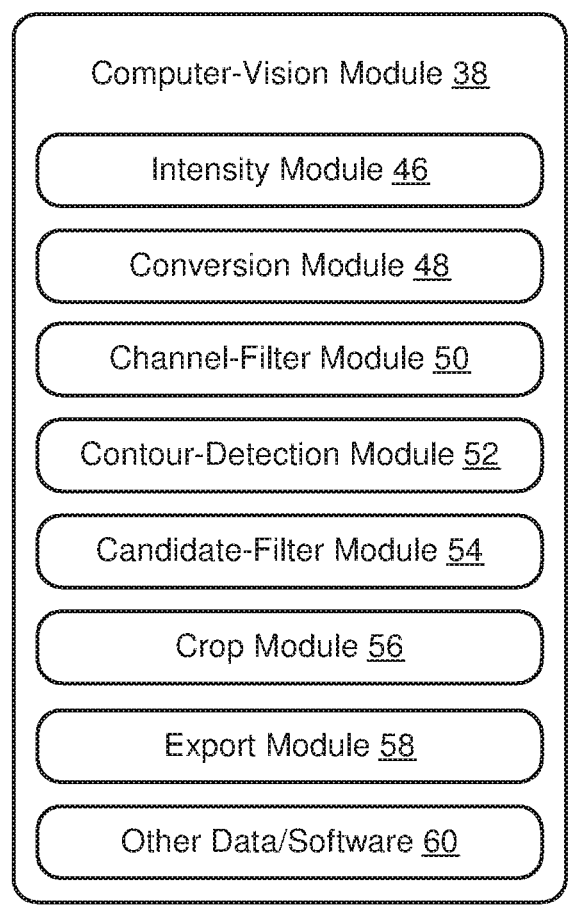
FIG. 4 is a schematic block diagram illustrating one embodiment of a computer-vision module in accordance with the present invention.
Figure 5:
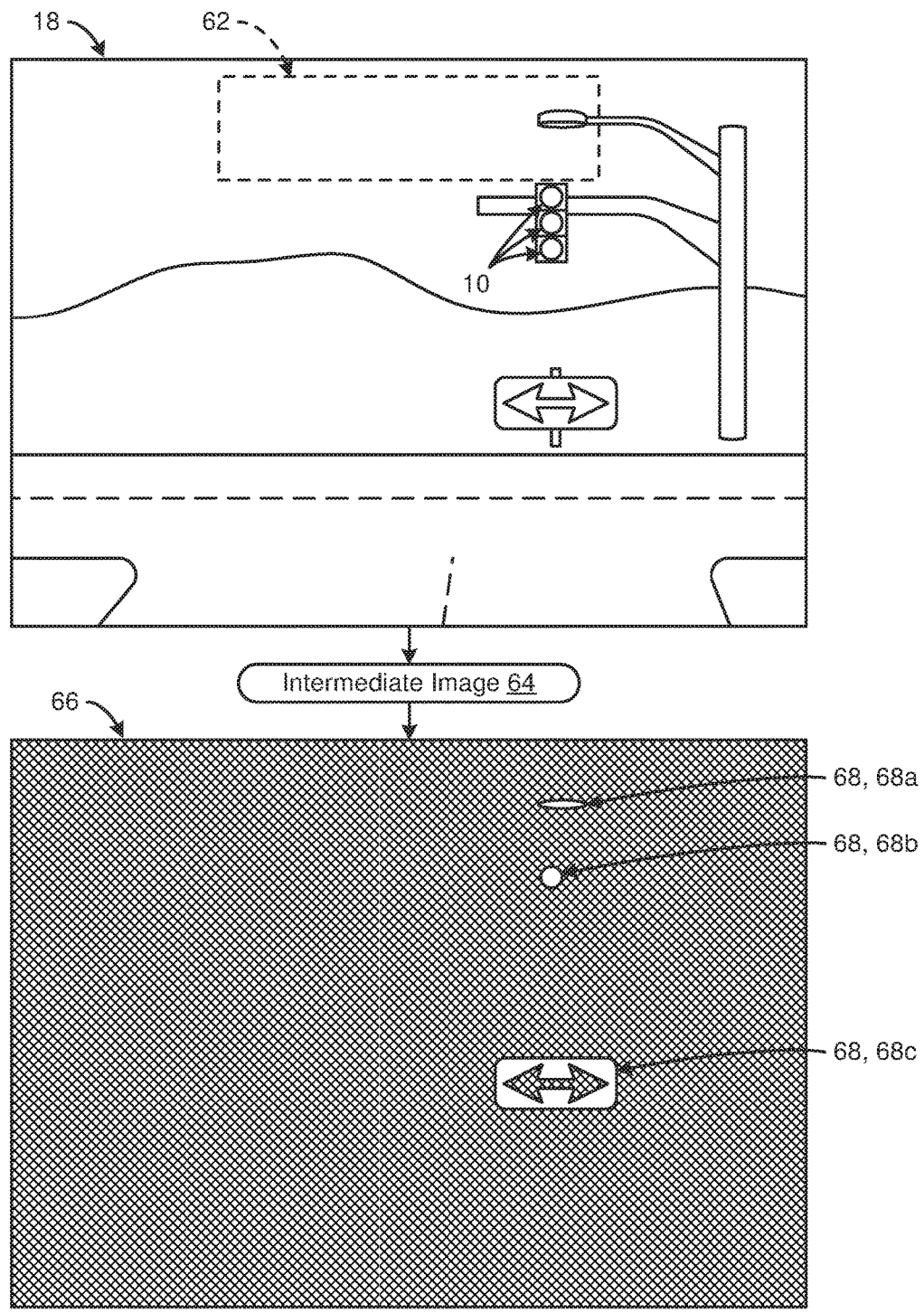
FIG. 5 is a schematic diagram illustrating the flow from the exemplary image of FIG. 1, to an intermediate image, and on to a channel-specific, threshold image.
Figure 6:
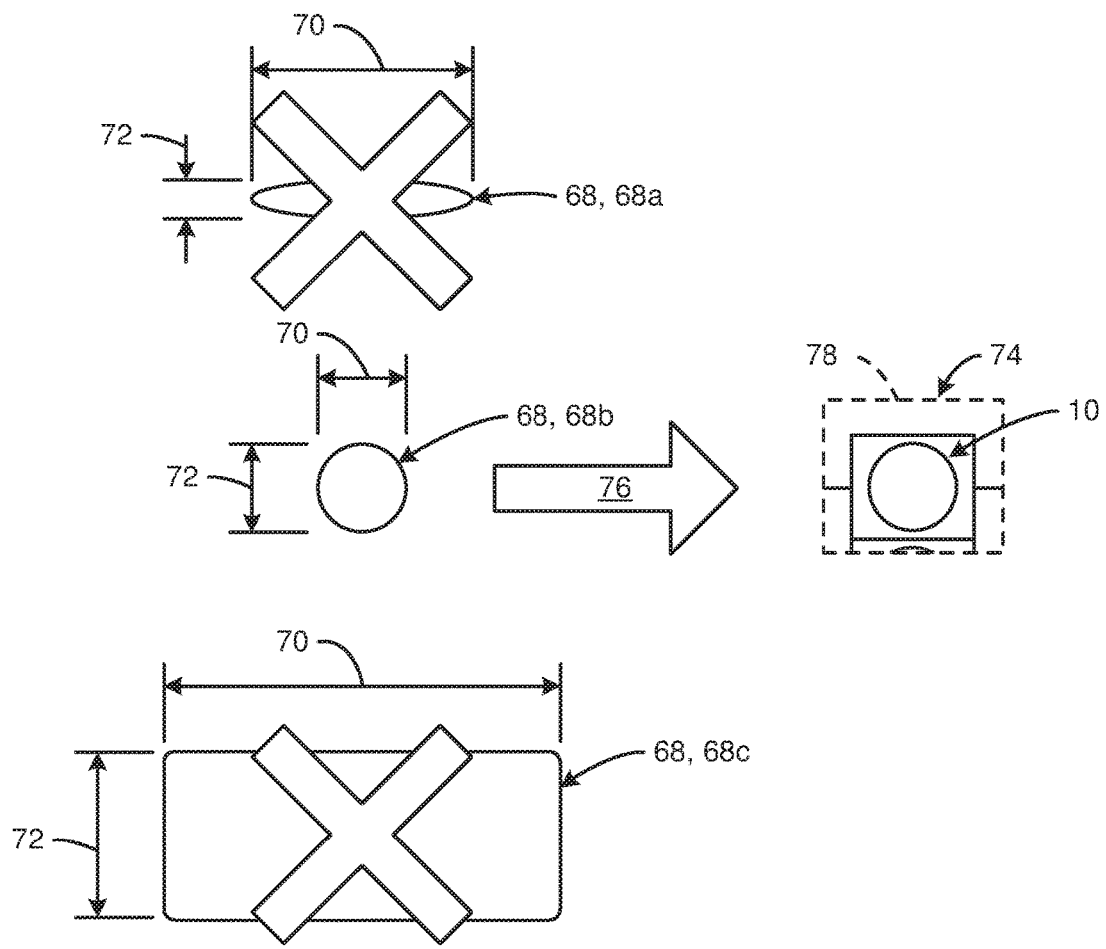
FIG. 6 is a schematic diagram illustrating certain candidate-filtering aspects of computer vision implemented by a computer-vision module in accordance with the present invention.

Referring to FIGS. 4-6, a computer-vision module 38 may determine in any suitable manner which portions of one or more images 18 are to be processed by a neural network module 40. In selected embodiments, to perform its intended function, a computer-vision module 38 may include an intensity module 46, conversion module 48, channel-filter module 50, contour-detection module 52, candidate-filter module 54, crop module 56, export module 58, other data or software 60, or the like or a combination or sub-combination thereof.

An intensity module 46 may determine whether an image 18 corresponds to a day condition or a night condition. In selected embodiments, an intensity module 46 may determine an average intensity of the pixels in an upper portion 62 of the image 18 at issue. If the average intensity is greater than or equal to a particular threshold, the intensity module 46 may determine that the image 18 corresponds to or represents (e.g., captures) a day condition. If the average intensity is less than the particular threshold, the intensity module 46 may determine that the image 18 corresponds to or represents (e.g., captures) a night condition.

The upper portion 62 analyzed by an intensity module 46 may be defined in any suitable manner. As illustrated, the upper portion 62 may comprises all pixels within a particular window or box. However, in selected embodiments, the upper portion 62 may simply be the top half, third, quarter, or the like of the image 18.

Most commonly, the color of the various pixels of an image 18 corresponding to one or more sensors 16 (e.g., one or more cameras) may be defined in terms of RGB values. For example, the color of each pixel may have a red value from 0 to 255, a green value from 0 to 255, and a blue value from 0 to 255. However, such a color scheme may not readily reveal all the information used by systems 14 in accordance with the present invention. Accordingly, in selected embodiments, a conversion module 48 may convert an image 18 into an intermediate image 64 that has a color scheme from which more useful information may be extracted.

In selected embodiments, a conversion module 48 may treat "day" and "night" images 18 differently. That is, when an intensity module 46 determines that an image 18 corresponds to a day condition, a conversion 48 may convert that image 18 to an intermediate image 64 in a first color scheme or space. When an intensity module 46 determines that an image 18 corresponds to a night condition, a conversion module 48 may convert that image 18 to an intermediate image 64 in a second, different color scheme or space.

For example, a conversion module 48 may convert "day" RGB images 18 HSV, HSB, HSL, or HSI intermediate images 64 and convert "night" RGB images 18 to LAB intermediate images 64. Intermediate images 64 corresponding to HSV, HSB, HSL, or HIS may have color schemes or color spaces with pixel colors represented by two scores or values corresponding to "hue" and "saturation" and a third score or value corresponding to "value," "brightness," "lightness" or "luminosity", and "intensity," respectively. Intermediate images 64 corresponding to LAB may have a color scheme or color space with pixel colors represented by scores or values corresponding to "lightness" and "a" and "b" color-opponent dimensions.

A channel-filter module 50 may produce one or more channel-specific, threshold images 66 from one or more intermediate images 64. A channel may correspond to or be a particular component of a color scheme or color space. For example, in the HSV, HSB, HSL, or HSI color scheme or color space, the "saturation" component of color may correspond to or be a channel. Similarly, in the LAB color scheme or color space, the "a" component of color may correspond to or be a channel. Accordingly, a channel-filter module 50 may process one or more intermediate images 64 to produce one or more channel-specific, threshold images 66 by filtering out all pixels having below a particular threshold on "saturation" and/or "a" channels.

For a particular intermediate image 64, a channel-filter module 50 may produce more than one channel-specific, threshold image 66. In such embodiments, different channel-specific, threshold images 66 may correspond to different thresholds. For example, a channel-filter module 50 may filter the "saturation" channel of an intermediate image 64 corresponding to a "day" condition at multiple threshold values (e.g., 50, 100, 150, 200, 250, or the like or a combination or sub-combination thereof) within the domain of that channel to obtain multiple channel-specific, threshold images 66. Similarly, a channel-filter module 50 may filter the "a" channel of an intermediate image 64 corresponding to a "night" condition at multiple threshold values (e.g., 50, 100, 150, 200, 250, or the like or a combination or sub-combination thereof) within the domain of that channel to obtain multiple channel-specific, threshold images 66. Using an array of threshold values may account for different intensities of sunlight or other light sources and different times of the day.

A contour-detection module 52 may delineate or identify the boundaries on one or more objects 68 in one or more channel-specific, threshold images 66. In selected embodiments, a contour-detection module 52 may obtained certain contours from one or more edges. However, the contours so identified may need to be object contours. Accordingly, the contours so identified may typically be closed curves.

In the hypothetical, channel-specific, threshold image 66 illustrated in FIG. 5, three objects 68 may be present. The objects 68 correspond to a street lamp 68a, red traffic light 68b, and road sign 68c. Accordingly, if a contour-detection module 52 were to operate on this channel-specific, threshold image 66, it may identify three contours, namely, a first contour corresponding to the street lamp 68a, a second contour corresponding to the red traffic light 68b, and a third contour corresponding to the road sign 68c.

A candidate-filter module 54 may use to one or more contours identified by a contour-detection module 52 to filter out objects 68 that are not likely to represent traffic lights 10. In selected embodiments, a candidate-filter module 54 may analyze the size and/or shape of one or more objects 68 to see if their size and/or shape fits within parameters that would be expected for a traffic light 10. If the size and/or shape does not fit within such parameters, the object 68 may be filter out.

For example, many if not most traffic lights 10 (even those that are arrows) have a width 70 that is substantially equal to their height 72. Accordingly, a candidate-filter module 54 may filter out objects 68 that do not have a ratio of width 70 to height 72 that is within a particular range. For example, in the hypothetical channel-specific threshold image 66 illustrated in FIG. 5, three objects 68 are be present. Contours identified for the objects 68 may indicate that the street lamp 68a and the road sign 68c have respective widths 70 that are more than twice their respective heights 72. Accordingly, a candidate-filter module 54 may filter out both objects 68a, 68c as having a low likelihood of representing traffic lights 10.

Alternatively, or in addition thereto, traffic lights 10 will have a relative size in an image 18. That is, they will cover or consume a number of pixels width-wise, height-wise, and/or area-wise that corresponding to a particular range. Accordingly, a candidate-filter module 54 may filter out objects 68 that are too large or too small (i.e., that fall outside of the particular range) in width 70, height 72, and/or area.

For example, in the hypothetical channel-specific threshold image 66 illustrated in FIG. 5, three objects 68 are be present. Contours identified for the objects 68 may indicate that the road sign 68c has width 70 that is greater (e.g., consumes more pixels) than would be expected for a traffic light 10. Accordingly, a candidate-filter module 54 may filter out that object 68c as having a low likelihood of representing a traffic light 10.

A crop module 56 may crop out one or more regions 74 of interest from an image 18 (e.g., portions 74 of an original RGB image) that correspond to one or more objects 68 that pass 76 through the filtering performed by a candidate-filtering module 54. In selected embodiments, the boundaries 78 of the cropping may match or closely track the contours identified by a contour-detection module 52. Alternatively, the boundaries 78 of the cropping may encompass more (e.g., slightly more) than the contours identified by a contour-detection module 52 in order to provide a little more context.

Once one or more regions 74 of interest have been cropped out, an export module 58 may send them on to an artificial neural network (e.g., an artificial neural network forming part of a neural network module 40) for classification in accordance with the present invention. Thus, classification may be performed only on small portions 74 of an image 18 that are likely to contain a traffic light 10. The relatively fast processing performed by a computer-vision module 38 may significantly lower the amount of time spent in the relatively slow and/or more computationally intense process of classification. Accordingly, detection and classification of traffic lights 10 in accordance with the present invention may be a relatively quick process (e.g., be completed in about 1 second or less).

Figure 7:
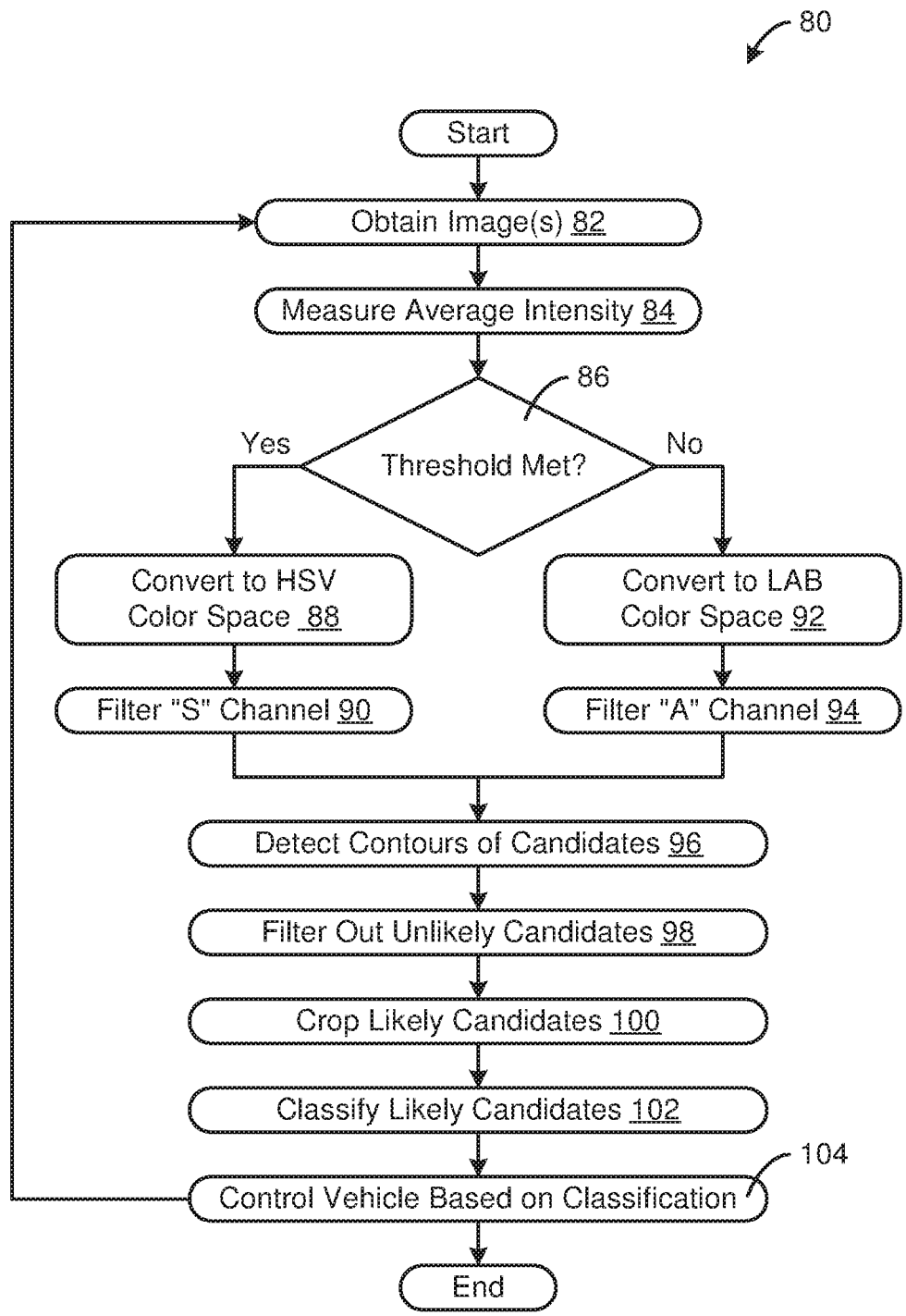
FIG. 7 is a schematic block diagram of one embodiment of a method for detecting and classifying traffic lights in accordance with the present invention.

Referring to FIG. 7, in selected embodiments, a process 80 of applying one or more classification algorithms of an artificial neural network to image data may begin with obtaining 82 one or more images 18 (e.g., one or more RGB images 18). The average intensity of a portion 62 (e.g., an upper portion 62) the one or more images 18 may be measured 84. A determination may then be made 86 as to whether the average intensity of the portion 62 is equal to or greater then a threshold.

If it is, the one or more images 18 may be converted 88 to form one or more intermediate images 64 in an HSV, HSB, HSL, or HSI color scheme or the like. Thereafter, the intermediate images 62 may be filtered 90 based on their "S" or "saturation" channel at one or more threshold values within the domain of that channel. Conversely, if the average intensity of the portion 62 is below the threshold, the one or more images 18 may be converted 92 to form one or more intermediate images 64 in a LAB color scheme or the like. Thereafter, the intermediate images 62 may be filtered 94 based on their "a" channel at one or more threshold values within the domain of that channel.

Filtering 90, 94 in accordance with the present invention may produce one or more channel-specific, threshold images 66. Accordingly, each of the one or more channel-specific, threshold images 66 may be processed in order to detect 96 any contours of any candidate objects 68 therewithin. Thereafter, candidate objects 68 that do not have a size and/or shape within certain ranges like that of a traffic light 10 may be filtered 98 out. In contrast, regions 74 of interest within the one or more images 18 (e.g., the original images 18 that were obtained 82) that correspond to (e.g., overlay, occupy the same pixel space as) candidate objects 68 that do have a size and/or shape within certain ranges like that of a traffic light 10 may be cropped 100 out and classified 102 by one or more artificial neural networks.

Thereafter, a vehicle 12 may be controlled 104 based on one or more classifications made 102 by the one or more artificial neural networks. Such controlling 104 may include issuing one or more warnings to a driver. Alternatively, or in addition thereto, such controlling 104 may include actively braking to reduce the speed of and/or stop the vehicle 12.

The flowchart in FIG. 7 illustrates the architecture, functionality, and operation of possible implementations of systems, methods, and computer-program products according to various embodiments in accordance with the present invention. In this regard, each block in the flowchart may represent a module, segment, or portion of code, which comprises one or more executable instructions for implementing the specified logical function(s). It will also be noted that each block of the flowchart illustration, and combinations of blocks in the flowchart illustration, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method for determining which portion or portions of an image to classify with an artificial neural network, the method comprising:
    converting an initial frame to an intermediate frame in a different color space or scheme;
    obtaining at least one threshold frame by filtering out from the intermediate frame all pixels having below a threshold on a specific channel or component of the different color space or scheme;
    extracting at least one contour from the at least one threshold frame;
    cropping out a first portion of the initial frame, the first portion encompassing an area including the at least one contour; and
    classifying, by an artificial neural network, the first portion.

2. The method of claim 1, wherein the initial frame is an RGB frame.

3. The method of claim 2, wherein the different color space or scheme is a non-RGB color space or scheme.

4. The method of claim 3, wherein the intermediate frame is an HSV, HSB, HSL, or HSI frame.

5. The method of claim 4, wherein the specific channel or component is a saturation channel or component.

6. The method of claim 5, wherein:
    the classifying comprises determining an affinity score between the first portion and each class of a plurality of classes; and
    the plurality of classes includes a not-a-traffic-light class, a red-traffic-light class, a green-traffic-light class, and a yellow-traffic-light class.

7. The method of claim 3, wherein the intermediate frame is a LAB frame.

8. The method of claim 7, wherein the specific channel or component is an "a" channel or component.

9. The method of claim 8, wherein:
    the classifying comprises determining an affinity score between the first portion and each class of a plurality of classes; and
    the plurality of classes includes a not-a-traffic-light class, a red-traffic-light class, a green-traffic-light class, and a yellow-traffic-light class.

10. The method of claim 1, wherein the initial frame is an RGB frame and the intermediate frame is a non-RGB frame.

11. A method comprising:
    receiving, by a computer system on-board a vehicle, an RGB frame captured by a forward-looking camera of the vehicle;
    processing, by the computer system, the RGB frame by
        converting the RGB frame to an intermediate frame in a non-RGB color space or scheme,
        obtaining at least one threshold frame by filtering out from the intermediate frame all pixels having below a threshold on a specific channel or component of the non-RGB color space or scheme,
        extracting at least one first contour from the at least one threshold frame,
        cropping out a first portion of the RGB frame, the first portion encompassing a first area including the at least one first contour, and
        classifying, by an artificial neural network, the first portion.

12. The method of claim 11, wherein the classifying comprises determining an affinity score between the first portion and each class of a plurality of classes that includes a not-a-traffic-light class, a red-traffic-light class, a green-traffic-light class, and a yellow-traffic-light class.

13. The method of claim 12, further comprising controlling braking of the vehicle in accordance with the determining.

14. The method of claim 11, further comprising comparing, by the computer system before the processing, a second portion of the RGB frame to an intensity threshold.

15. The method of claim 14, wherein:
    the intermediate frame in an HSV, HSB, HSL, or HSI frame when the intensity of the second portion of the RGB frame is greater than the intensity threshold; and
    the intermediate frame in a LAB frame when the intensity of the second portion of the RGB frame is less than the intensity threshold.

16. The method of claim 15, wherein:
the specific channel or component is a saturation channel or component when the intensity of the second portion of the RGB frame is greater than the intensity threshold; and
the specific channel or component is an "a" channel or component when the intensity of the second portion of the RGB frame is less than the intensity threshold.

17. The method of claim 16, wherein the classifying comprises determining an affinity score between the first portion and each class of a plurality of classes that includes a not-a-traffic-light class, a red-traffic-light class, a green-traffic-light class, and a yellow-traffic-light class.

18. A system comprising:
a vehicle;
at least one forward-looking camera secured to the vehicle and configured to capture an initial frame;
at least one processor carried on-board the vehicle; and
memory operably connected to the at least one processor, the memory storing
a computer-vision module programmed to process the initial frame by (1) converting the initial frame to an intermediate frame in a different color space or scheme, (2) obtaining at least one threshold frame by filtering out from the intermediate frame all pixels having below a threshold on a specific channel or component of the different color space or scheme, (3) extracting at least one first contour from the at least one threshold frame, and (4) cropping out a first portion of the initial frame, the first portion encompassing a first area including the at least one first contour, and
a neural network module programmed to determine an affinity score between the first portion and each class of a plurality of classes.

19. The system of claim 18, wherein the plurality of classes includes a not-a-traffic-light class, a red-traffic-light class, a green-traffic-light class, and a yellow-traffic-light class.

20. The system of claim 19, wherein the memory further comprises a control module programmed to control braking of the vehicle in accordance with determinations made by the neural network module.

\* \* \* \* \*